Figure 1:
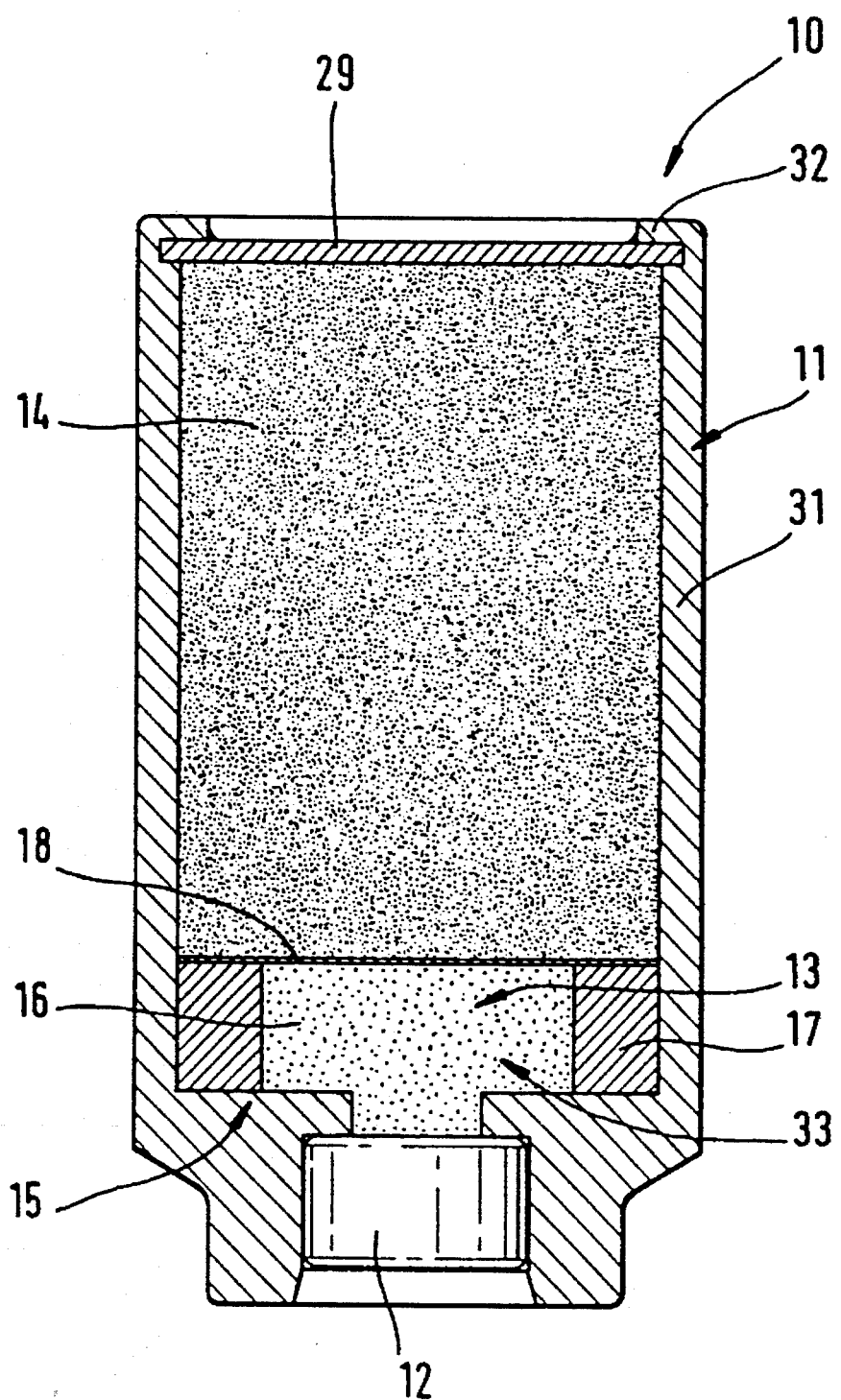

United States Patent [19]
Kothe

[11] Patent Number: 5,460,096
[45] Date of Patent: Oct. 24, 1995

[54] GAS GENERATOR, PARTICULARLY A MECHANICALLY TRIGGERABLE GAS GENERATOR

[75] Inventor: Thorsten Kothe, Achim, Germany

[73] Assignee: Comet GmbH Pyrotechnik-Apparatebau, Germany

[21] Appl. No.: 249,852

[22] Filed: May 26, 1994

[30] Foreign Application Priority Data

May 26, 1993 [DE] Germany .................. 9307940 U

[51] Int. Cl.⁶ .................................................. C06D 5/00
[52] U.S. Cl. ..................... 102/530; 102/470; 280/741
[58] Field of Search ..................... 102/430, 443, 102/444, 469, 470, 530, 531; 280/741

[56] References Cited

U.S. PATENT DOCUMENTS

| | | | |
|---|---|---|---|
| 777,319 | 12/1904 | Ulrich | 102/430 |
| 2,592,623 | 4/1952 | Turnbull | 102/38 |
| 2,877,709 | 3/1959 | Duckworth | 102/530 |
| 2,974,592 | 3/1961 | Williams et al. | 102/530 |
| 3,354,571 | 11/1967 | Parker | 102/530 |
| 3,732,820 | 5/1973 | Hendricks | 102/45 |
| 3,818,834 | 6/1974 | Baumgartener | 102/530 |
| 4,686,905 | 8/1987 | Szabo | 102/444 |

FOREIGN PATENT DOCUMENTS

| | | | |
|---|---|---|---|
| 628224 | 9/1961 | Canada | 102/530 |
| 0505728 | 2/1992 | Germany | F42C 19/10 |

*Primary Examiner*—Harold J. Tudor
*Attorney, Agent, or Firm*—Deveau, Colton & Marquis

[57] ABSTRACT

Gas generators having mechanical triggering have a cylindrical casing in which the various component parts are accommodated. The assembly of known gas generators is rather complex because of the different component parts. In the gas generator according to the invention the individual component parts are distributed in such a manner that essentially three units are formed, namely a priming agent, a pyrotechnic charge and an ignition unit comprising a holder means and an ignition charge. The priming agent is separated from the pyrotechnic charge by the ignition unit. The gas generator constructed in this way permits simple charging of the casing with the priming agent, the pyrotechnic charge and the ignition unit.

10 Claims, 2 Drawing Sheets

GAS GENERATOR, PARTICULARLY A MECHANICALLY TRIGGERABLE GAS GENERATOR

The invention relates to a gas generator, particularly a mechanically triggerable gas generator.

Gas generators are for example used in safety belt restraint systems in motor vehicles. Gas generators are mass-produced articles. For manufacturing reasons gas generators should be of simple design. This ensures easy assembly and reduces production costs.

From EP 0 505 728 A1 a mechanically triggerable gas generator is known. A priming cap and a pyrotechnic charge, together with other components which are not more fully described, are arranged in a cylindrical casing. A percussion cap of the type customary in mechanically triggerable gas generators acts on the priming cap. An essential disadvantage of the known gas generator is that the design of the gas generator is too complicated. Numerous working stages have to be carried out in its production. This increases the expenditure for production and therefore the cost per piece.

Starting from this prior art, the object on which the invention is based is to provide a gas generator of simple design.

In the gas generator the pyrotechnic charge and the ignition charge are separated from one another. This separation of the ignition charge from the pyrotechnic charge makes an unintentional reaction of the two usually pulverulent charges impossible.

The ignition unit preferably comprises a holder means and the ignition charge. The holder means comprises a ring and a cover joined to the ring. In this way an ignition unit of particularly simple design is obtained. It can be installed in the casing of the gas generator at very low production cost.

In another gas generator serving to achieve the present object, or in a preferred development of the invention, the casing has two container spaces accessible from openings in opposite end faces. This design of the casing considerably facilitates the production of the gas generator. The ignition unit and the pyrotechnic charge can be inserted from one end face, and the priming agent from the other end face, into the casing. In the production of the gas generator there is therefore no risk that the pulverulent ignition charge will fall out of the holder means of the ignition unit.

In an advantageous development of the gas generator a separator element constricting the cross-sections of the two container spaces is arranged between the latter. The separator element is a component part of the casing. The separator element assists the simple production of the gas generator. It serves on the one hand as a stop for the insertion of the ignition unit, and on the other hand as a stop for the insertion of the priming agent. It defines the depths of insertion of the component parts, which have to be inserted into the casing in different assembly directions.

Figure 2:
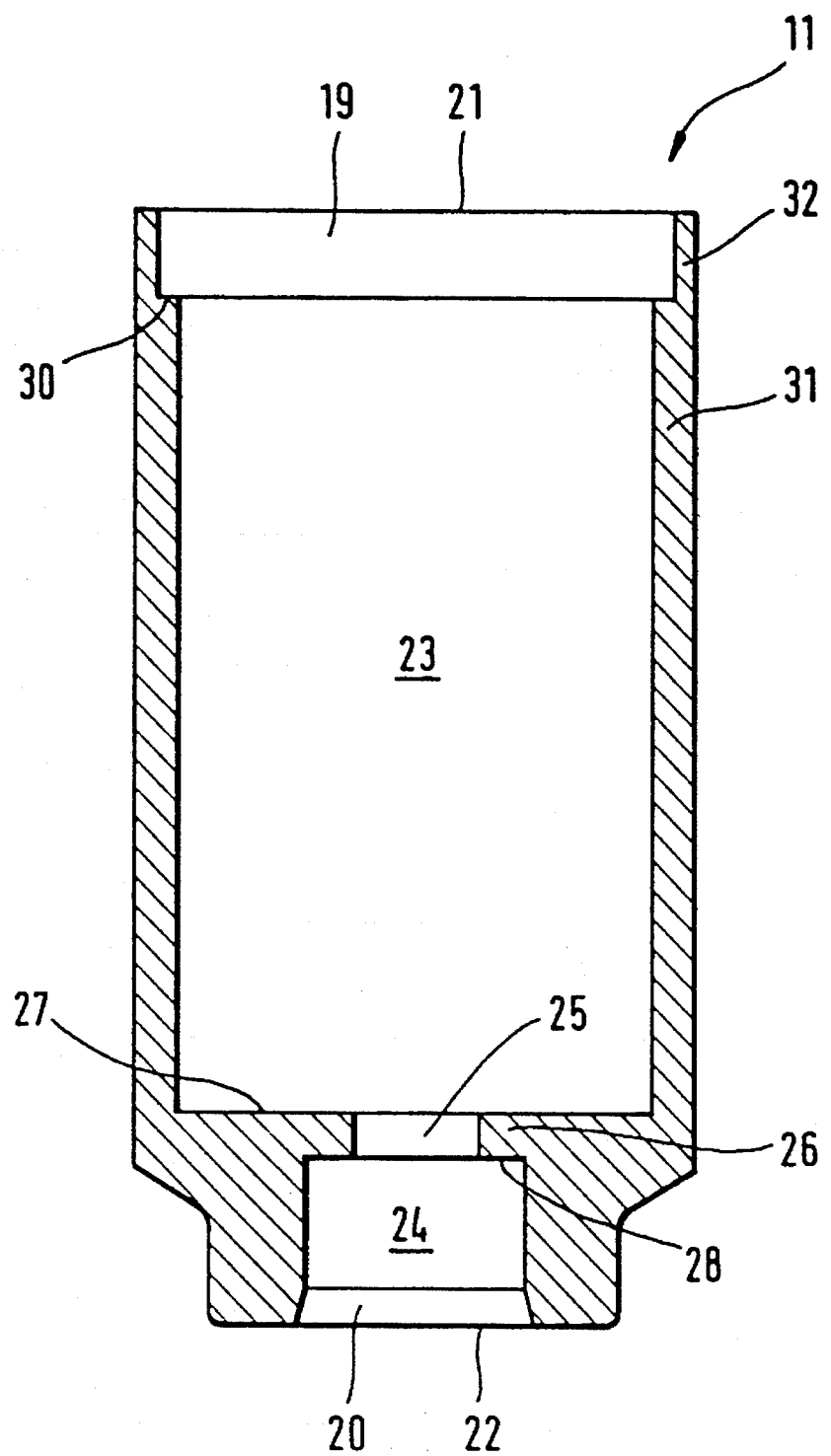

Further preferred developments of the invention can be seen in the subclaims and the description. Preferred exemplary embodiments of the invention are explained in more detail below by means of the drawing. In the drawing:

FIG. 1 shows a gas generator in cross-section, and
FIG. 2 shows a casing of a gas generator in a similar view to FIG. 1.

The gas generator shown here serves as a fast trigger for safety belt restraint systems in motor vehicles. The gas generator can be triggered mechanically.

The gas generator 10 shown in the drawing has a casing 11 of cylindrical cross-section. The casing 11 of the gas generator 10 has two container spaces 23, 24 accessible from openings 19, 20 in opposite end faces 21, 22 (FIG. 2). A separator means is situated between the container spaces 23, 24. The separator means is in the form of a circumferential collar 26. The latter surrounds a through opening 25, by which the container spaces 23, 24 are in communication with one another. The through opening 25 has a smaller diameter than the container spaces 23, 24. The collar 26 is a part of the casing 11. The collar 26 forms in each of the container spaces 23, 24 a stop 27, 28 for the subassemblies to be inserted into the cavities 23, 24.

In the casing 11 of the gas generator 10 are arranged a priming agent, particularly a priming cap 12, an ignition unit 13 and a pyrotechnic charge 14 (FIG. 1). The ignition unit 13 is arranged between the priming cap 12 and the pyrotechnic charge 14. The ignition unit 13 consists of a holder means 15 and an ignition charge 16. The ignition charge 16 is accommodated in the holder means 15. The holder means 15 consists of a ring 17 and a cover 18 joined to the ring 17. The ring 17 and the cover 18 form a cavity 33 accessible from one side of the holder means 15. The ignition charge 16 is filled loose, in powder form, into the holder means 15, specifically into the cavity 33. The cover 18 consists for example of a thin sheet or tissue paper, bonded to the ring 17. The cover 18 closes off the ignition unit 13 on the side facing the pyrotechnic charge 14. The ignition charge 16 and the pyrotechnic charge 14 are thus separated from one another by the cover 18 in order to prevent a reaction between the ignition charge 16 and the pyrotechnic charge 14 before the priming of the gas generator.

The ignition unit 13 can be introduced into the container space 23 through the opening 19 in the end face 21. The ignition unit 13 is inserted into the container space 23 as far as the stop 27. The pyrotechnic charge 14 can be introduced onto the ignition unit 13, which is closed off by the cover 18. The container space 23 is completely filled by the ignition unit 13 and the pyrotechnic charge 14. The pyrotechnic charge is closed off from the outside by a full-surfaced disk 29. A recess in the region of the peripheral wall 31 of the casing 11 serves as a stop 30 for the disk 29. The peripheral wall 31 has a web 32 resulting from the recess. After the disk 29 has been placed in position, the web 32 is turned over and thus secures the disk 29 to the casing 31.

The priming cap 12 can be introduced into the cavity 24 via the opening 20 in the end face 22. The priming cap is inserted into the cavity 24 as far as the stop 28 and partly closes off the ignition charge 16 of the ignition unit 13.

I claim:

1. A mechanically triggerable gas generator comprising a cylindrical casing in which a pyrotechnic charge, an ignition unit and a priming agent are arranged, wherein the casing has an inside diameter, said casing having two interconnected container spaces accessible from openings in opposite end faces of the casing, the ignition unit and the pyrotechnic charge being arranged in a first container space, and the priming agent being arranged in a second container space, and wherein the ignition unit comprises a holder means comprised of a ring and cover, the cover being joined to the ring said ring having an outside diameter and an inside diameter which is substantially constant throughout the thickness of the ring and said ring comprising a single solid element between said inside diameter and said outside diameter, said ring having substantially equal diameter openings at both ends, the cover separating the pyrotechnic charge from the ignition unit, and wherein an ignition charge is arranged in the ring and in contact with said priming agent.

2. The gas generator as claimed in claim 1, wherein the iginition charge is at least partly contained in the holder means.

3. The gas generator as claimed in claim 1, wherein the cover is gas tightly joined to the ring.

4. The gas generator as claimed in claim 1, wherein the cover is in the form of a thin sheet.

5. The gas generator as claimed in claim 1, wherein the priming agent closes off the ignition charge at least partly on the side remote from the pyrotechnic charge.

6. The gas generator as claimed in claim 1, wherein said has two container spaces are accessible from openings in opposite end faces.

7. The gas generator as claimed in claim 6, wherein a separator element constricting inside diameters of the two container spaces is arranged between the container spaces.

8. The gas generator as claimed in claim 7, wherein the separator element is a component part of the casing.

9. The gas generator as claimed in claim 8, wherein the separator element is in the form of a circumferential collar arranged between the two container spaces on the casing.

10. The gas generator as claimed in claim 6, wherein the outside diameter of the ring of the ignition unit and the inside diameter of the first container space are approximately equal in size.

* * * * *